Sept. 2, 1952  A. S. KROTZ  2,609,194
SPRING
Original Filed Feb. 3, 1943

Inventor
Alvin S. Krotz
By
Att'y

Patented Sept. 2, 1952

2,609,194

UNITED STATES PATENT OFFICE 2,609,194

SPRING

Alvin S. Krotz, Akron, Ohio, assignor to The B. F. Goodrich Company, New York, N. Y., a corporation of New York Original application February 3, 1943, Serial No. 474,545, now Patent No. 2,409,500, dated October, 15, 1946. Divided and this application August 6, 1946, Serial No. 688,669

5 Claims. (Cl. 267—21)

This invention relates to springs and especially to torsion springs of the type having an inner shaft member, a circumferentially discontinuous outer sleeve structure and intervening body of resilient rubber or other rubber-like material between the inner and outer members adapted to be stressed torsionally upon relative rotational movement of the inner shaft member and outer sleeve structure.

This application is a division of my Pat. No. 2,409,500, issued October 15, 1946 for Spring.

A chief object of the invention is to provide for effectively locking the torsion spring against objectionable movement with respect to its mounting, and especially to lock the same against rotational slippage. Further objects are to provide for increasing the strength of the locking against rotation by a self-energizing action and to provide the locking while maintaining a maximum working thickness of the springing medium. Additional objects are to provide for simplicity of construction, economy of materials, and convenience of manufacture and assembly.

A more specific object is to provide a simplified and economical structure in which locking action is obtained by the meshing engagement of projections in one body with recesses in the other.

These and further objects will be apparent from the following description, reference being had to the accompanying drawings in which.

Figure 1:
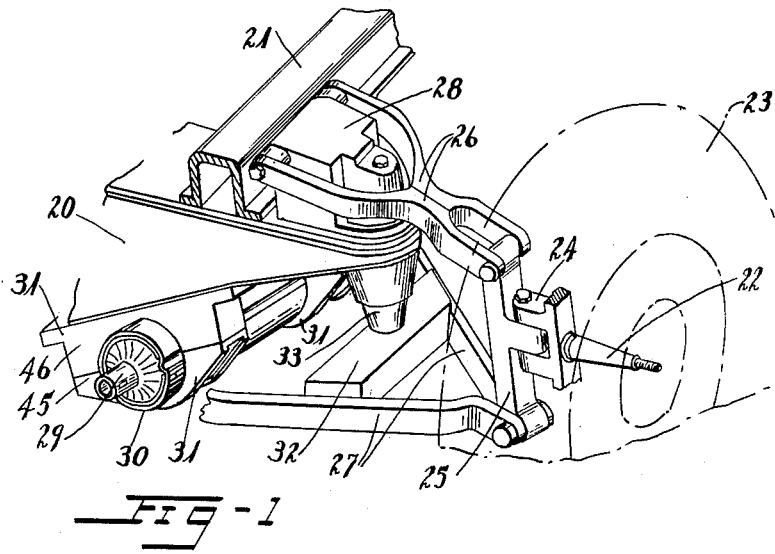
Fig. 1 is a perspective view of a portion of a vehicle suspension incorporating a torsion spring constructed in accordance with and embodying the invention.

Features of the invention are useful in springs generally, but the invention is especially useful in its application to wheel suspensions of vehicles. In the drawings various of the embodiments of the invention are shown as applied to the independent vehicle wheel suspension of Fig. 1, by way of example, which suspension comprises a cross member 20 mounted on a longitudinal frame or body member 21 and linked to a spindle 22 which supports a wheel 23. The spindle 22 is supported by a king-pin member 24 which is pivotally connected to an upright member 25. Upper link arms 26, 26 and lower link arms 27, 27 for connecting the frame member 20 and the wheel 23 are pivotally connected at the upper and lower ends of member 25, while the arms 26, 26 are pivotally connected at their other ends to a mounting member 28 on the frame member 20, and arms 27, 27 are suitably attached to a shaft 29 of a torsion spring or bushing 30, the bushing 30 being mounted on the frame member 20 by means of bracket members 31, 31.

The pivotal connections of the link arms 26, 26 and 27, 27 at the bracket member 25 and at the mounting member 28 may comprise bodies of rubber-like material between metal parts or these may be simple pivotal joints or anti-friction bearings as desired.

A stop-member 32 may be mounted on the arms 27, 27 to permit bottoming of a resilient member 33 mounted on the frame member 20 to cushion extreme deflections of the suspension.

The torsion bushing 30 provides springing of the vehicle by resiliently resisting relative vertical movement between the body and the wheels of the vehicle through torsional stress on the resilient rubber or other rubber-like material of the bushing.

Figures 2, 3:
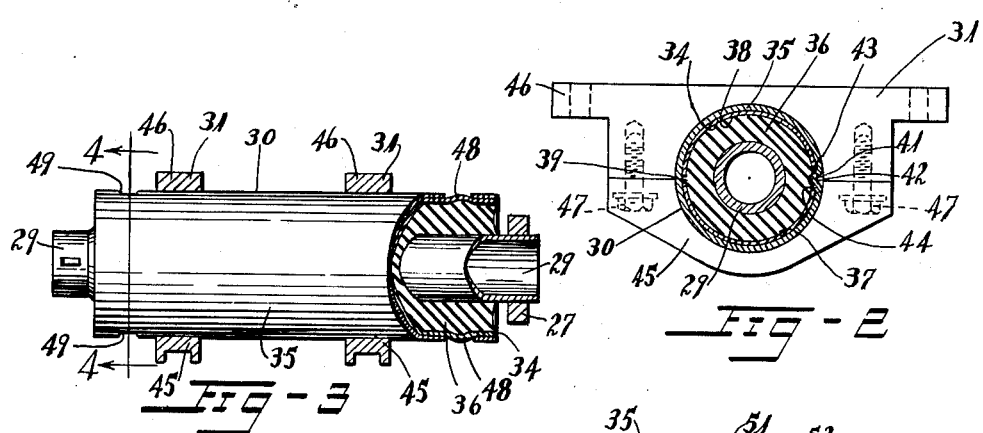
Fig. 2 is an end view of the spring and bracket shown in Fig. 1 with the spring being shown in section.
Fig. 3 is a side elevation of a modified construction, parts being broken away and sectioned.

One form of generally cylindrical torsion bushing 30 is shown in the illustrative embodiment of Figs. 1 and 2 of the drawings, in which the bushing comprises the inner torque member or inner shaft member 29, a pair of outer annular shell or sleeve members 34 and 35 comprising an outer torque member, and a sleeve or body 36 of resilient rubber or other rubber-like material between the shaft 29 and the shell member 34.

The outermost shell 35 may be in one piece and axially creased to project inwardly on one side while the innermost shell 34 may be axially split by recesses or slots on two sides to provide two sleeve parts 37, 38, the recesses being shown at 39, 41. An inward projection or crease 42 in the outer shell provides means overlying and entering the recess 41 and having a pair of shoulders adapted to engage one or the other of or both the edges 43, 44 of the inner shell 34. Some initial radial compression is desirable for increasing the life of the rubber-like material under the stresses encountered in use, and for facilitating a self-effecting arch ring or binding action hereinafter described. In some cases the recess at 39 may be omitted in the inner shell 34, with good results, the discontinuity of the shell being supplied by the other recess at 41.

The clamping bracket members 31, 31 which are mounted on the frame member 20 for holding the bushing 30 preferably comprise an outer portion 45 and an inner portion 46 fastened together by means of bolts 47, 47. The outer shell 35 of the bushing 30 is retained and held in fixed relationship with the bracket members 31, 31 by tight clamping or in any other suitable manner. The thickness of the inner shell 34 may be relatively small as the shell 34 may derive support from the outer shell 35 and from the intervening body of rubber-like material 36.

Under a twisting load on the spring applied to the shaft 29 in the counter-clockwise direction as in Figs. 1 and 2, the edge 44 is restrained from movement by the lower shoulder of the projection 42, the portion of the shell 34 which trails the edge 44 increases the force of its frictional engagement with the outer shell by the tendency of such trailing portion to unwrap because of a self-energizing effect. Forces in the bushing produce a tendency for radially outward movement or unwrapping of the part 37 of the inner shell 34 against the outer shell 35 under the torsional stresses set up in the rubber-like material of the bushing 30 as the load rotates the shaft 29. This action takes place whether the shell is in one piece or is split as at 39 into sections. In some circumstances the load may be applied in the opposite or clockwise direction, as viewed in Fig. 2. In such event the edge 43 engages the upper shoulder of the crease 42 and an increase in the binding action of the portion of the shell 34 which trails the edge 43 takes place by its tendency to unwrap in the clockwise direction against the outer shell 35.

Figure 4:
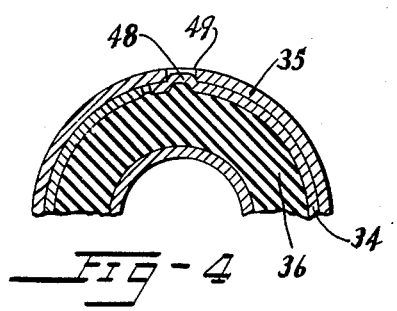
Fig. 4 is a section taken along the line 4—4 of Fig. 3, parts being broken away.

Alternatively, the sections of the split shell 34 and the outer shell 35 may be secured at the desired points of attachment by means of raised portions or projections 48 provided on the inner shell 34 and adapted to be held in holes or recesses in the outer shell 35, as for example, by raised projections 48, 48 and corresponding recesses 49, 49 shown in the embodiment of Figs. 3 and 4, thereby providing a simplified and economical, yet effective, structure in which resistance is provided to the tendency for longitudinal or axial movement in addition to the resistance to rotation. Or, if desired, radially inwardly extending projections 51 may be provided in the outer shell member 35 adapted to fit corresponding recesses 52 provided in the split shell 34 as shown in the embodiment of Fig. 5, for like purposes.

Assembly of the torsion springs may be accomplished in several ways. The body of rubber-like material 36 may be vulcanized to the inner shell member 34 before or after but preferably before the inner shell 34 is forced into the outer shell 35. In the embodiment shown in Fig. 1 and Fig. 2 the inner shell may be inserted into the outer shell such that the projection 42 on the outer shell fits in the recess 41 of the inner shell or the projection may be formed after insertion of the inner shell 34 by bending the material of the outer shell 35 into the recess of the inner shell.

In the modification shown in Fig. 4 and Fig. 3 the projections 48 in the inner shell must be formed before insertion of the inner shell 34 into the recesses 49 in the outer shell. When the inner shell 34 is inserted in the outer shell 35 and the projections 48 aligned with the recesses 49, the projections will snap into the recesses because of the force exerted by the body of rubber-like material 36 radially outward upon the inner shell.

Figure 5:
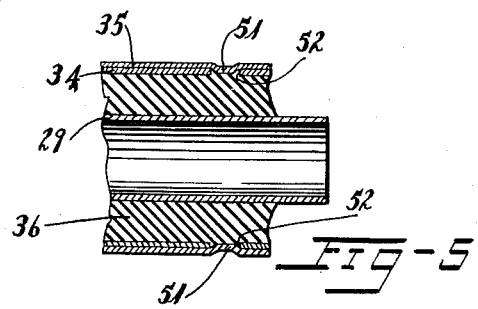
Fig. 5 is a fragmentary side elevation of another modification.

In the assembly of the modification shown in Fig. 5 the recesses 52 in the inner shell 34 will snap around the projections 51 in the outer shell when the inner shell is inserted in the outer shell and the projections and recesses are aligned or the projections 51 may be formed after the inner shell is inserted by bending the material of the outer shell into the recesses 52 in the inner shell.

While the embodiments hereinabove described illustrate application of the invention to cases wherein the swinging arm is secured to the inner shaft and the outer sleeve is secured to a frame structure, it will be understood that the benefits of these embodiments are applicable as well to cases where the conditions are reversed, that is the swinging arm is secured to the outer sleeve by the spring and the inner shaft element is secured to the frame.

Variations may be made without departing from the scope of the invention as it is defined by the following claims.

I claim:

1. A torsion spring comprising inner and outer torque structures and an intervening body of resilient rubber-like material secured to said structures, the outer torque structure comprising an inner sheet metal sleeve and an outer circumferentially continuous sheet metal sleeve, one of the sleeves having a circumferentially discontinuous aperture through the sheet metal wall thereof and the other of the sleeves having the sheet metal thereof indented at one face to provide a circumferentially discontinuous projection at the opposite face for seating in said circumferentially discontinuous aperture of the other sleeve and thereby providing a lock against relative rotation of the sleeves.

2. A torsion spring comprising inner and outer torque structures, the outer torque structure comprising an outer circumferentially continuous sheet metal sleeve and an inner circumferentially discontinuous sheet metal sleeve, an intervening body of resilient rubber-like material bonded to the inner torque structure and to said inner sleeve and pressing said inner sleeve against said outer sleeve and cushioning relative movement of said inner and outer torque structures, one of the sleeves having a circumferentially discontinuous aperture through the sheet metal wall thereof, and the other of the sleeves having the sheet metal thereof indented at one face to provide a circumferentially discontinuous projection at the opposite face for seating in said circumferentially discontinuous aperture of the other sleeve and thereby providing a lock against relative rotation of the sleeves.

3. A torsion spring comprising inner and outer torque structures, the outer torque structure comprising an outer circumferentially continuous sheet metal sleeve and an inner circumferentially discontinuous sheet metal sleeve, an intervening body of resilient rubber-like material bonded to the inner torque structure and to said inner sleeve and pressing said inner sleeve against said outer sleeve and cushioning relative movement of said inner and outer torque structures, said inner sleeve having a circumferentially discontinuous aperture through the sheet metal wall thereof, and said outer sleeve having the sheet metal thereof indented in the outer face thereof to provide a circumferentially discontinuous projection at the inner face thereof for seating in said circumferentially discontinuous aperture of said inner sleeve and thereby providing a lock against relative rotation of the sleeves.

4. A torsion spring comprising inner and outer torque structures, the outer torque structure comprising an outer circumferentially continuous sheet metal sleeve and an inner circumferentially discontinuous sheet metal sleeve, an intervening body of resilient rubber-like material bonded to the inner torque structure and to said inner sleeve and pressing said inner sleeve against said outer sleeve and cushioning relative movement of said inner and outer torque structures, said outer sleeve having a circumferentially discontinuous aperture through the sheet metal wall thereof, said inner sleeve having the sheet metal thereof indented at the inner face thereof to provide a circumferentially discontinuous projection at the outer face thereof for seating in said circumferentially discontinuous aperture of said outer sleeve and thereby providing a lock against relative rotation of the sleeves.

5. In a spring suspension for supporting resiliently and rotatably around an axis two members with respect to one another, a first sleeve of resilient non-metallic material such as rubber, said sleeve having its inner surface rigidly connected to one of said two members, and a second sleeve of sheet metal adhesively connected to the outer surface of said first sleeve, said second sleeve being provided with at least one longitudinal slot, the other of said two members comprising a circumferentially continuous sheet metal wall overlying said second sleeve, a portion of said wall having the sheet metal thereof indented at one face to provide a projection at the opposite face for seating in said slot and thereby providing a lock against relative rotation of said second sleeve and the latter member.

ALVIN S. KROTZ.

REFERENCES CITED

The following references are of record in the file of this patent:

UNITED STATES PATENTS

| Number | Name | Date |
|---|---|---|
| 997,799 | Friel | July 11, 1911 |
| 1,710,809 | Broadwell | Apr. 30, 1929 |
| 1,993,260 | Burns | Mar. 5, 1935 |
| 2,158,028 | Burke | May 9, 1939 |
| 2,203,344 | Tjaarda | June 4, 1940 |
| 2,226,406 | Krotz | Dec. 24, 1940 |
| 2,324,997 | Brown | July 20, 1943 |
| 2,371,864 | Woolson et al. | Mar. 20, 1945 |

FOREIGN PATENTS

| Number | Country | Date |
|---|---|---|
| 465,394 | Great Britain | May 6, 1937 |